United States Patent
Mendelson et al.

(12)

(10) Patent No.: US 12,554,724 B1
(45) Date of Patent: Feb. 17, 2026

(54) RESOLVING COMPLEX MATCH CANDIDATES USING LARGE LANGUAGE MODEL EXPLANATIONS OF AMBIGUOUS FEATURES

(71) Applicant: Intuit Inc., Mountain View, CA (US)

(72) Inventors: Shon Mendelson, Tel Aviv (IL); Ruobing Lu, Mountain View, CA (US); William Fox, Mountain View, CA (US); Taylor Cressy, Los Angeles, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/233,135

(22) Filed: Jun. 10, 2025

(51) Int. Cl.
| | |
|---|---|
| *G06F 16/00* | (2019.01) |
| *G06F 16/2457* | (2019.01) |
| *G06F 16/248* | (2019.01) |
| *G06F 18/232* | (2023.01) |

(52) U.S. Cl.
CPC ........ *G06F 16/2457* (2019.01); *G06F 16/248* (2019.01); *G06F 18/232* (2023.01)

(58) Field of Classification Search
CPC ... G06F 16/2457; G06F 16/248; G06F 18/232
USPC ................................................ 707/600–899
See application file for complete search history.

(56) References Cited

U.S. PATENT DOCUMENTS

| | | | |
|---|---|---|---|
| 2017/0004198 A1* | 1/2017 | Zholudev | G06F 16/382 |
| 2024/0160644 A1* | 5/2024 | Botea | G06F 16/285 |
| 2025/0110957 A1* | 4/2025 | Baldua | G06F 16/2425 |
| 2025/0117605 A1* | 4/2025 | De Wynter | G06F 40/30 |
| 2025/0131623 A1* | 4/2025 | Boyd | G06N 3/0895 |
| 2025/0156484 A1* | 5/2025 | Rankin | G06N 3/045 |
| 2025/0348584 A1* | 11/2025 | Satpathy | G06F 21/56 |

\* cited by examiner

*Primary Examiner* — Michelle N Owyang
(74) *Attorney, Agent, or Firm* — Lathrop GPM LLP

(57) ABSTRACT

A method includes obtaining, from a matching model, for a user input, a set of candidate matches generated using a corresponding set of features. The corresponding set of features is partitioned into a first feature subset and a second feature subset. For each candidate match in the set of candidate matches, a candidate feature subset of features is individually generated. The candidate feature subset of features are selected from the first feature subset and the second feature subset for the candidate match. A multitude of candidate feature subsets corresponding to the set of candidate matches is obtained. The multitude of candidate feature subsets is clustered to obtain a first feature pattern and a second feature pattern. A large language model (LLM) generates a suggestion to modify the user input by processing the first feature pattern and the second feature pattern. The method further includes presenting the suggestion of the LLM.

20 Claims, 5 Drawing Sheets

RESOLVING COMPLEX MATCH CANDIDATES USING LARGE LANGUAGE MODEL EXPLANATIONS OF AMBIGUOUS FEATURES

BACKGROUND

Explainable Artificial Intelligence (XAI) refers to techniques in artificial intelligence that make the behavior and decision-making processes of artificial intelligence systems, understandable and interpretable to humans. Integrating explainability into AI systems such as complex cross-reference matching systems may provide human-understandable reasons or evidence for a prediction or action. As a result, users may hold trusted AI systems accountable for the AI system's outputs. The integration of explainability into AI systems may further provide regulatory compliance and ethical AI deployment in sensitive domains, e.g., healthcare, finance, law, etc.

Complex cross-reference matching AI systems, in particular, are faced with several technical challenges in operating in ambiguous data environments, with requirements for accuracy and explainability. Ambiguous data environments have datasets to cross-reference that may originate from different systems with varying schemas. Moreover, the datasets may be unstructured, with missing, or inconsistent field values. The actual matches in the datasets may be one-to-many. Reconciliation of discrepancies in attributes, may add to the complexities of explainability.

SUMMARY

In general, in one aspect, one or more embodiments relate to a method. The method includes obtaining, from a matching model, for a user input, a set of candidate matches generated using a corresponding set of features. The method further includes partitioning the corresponding set of features into a first feature subset and a second feature subset. The method further includes individually generating, for each candidate match in the set of candidate matches, a candidate feature subset of features selected from the first feature subset and the second feature subset for the candidate match. A multitude of candidate feature subsets corresponding to the set of candidate matches is obtained. The method further includes clustering the multitude of candidate feature subsets to obtain a first feature pattern and a second feature pattern. The method further includes generating by a large language model (LLM), a suggestion to modify the user input by processing the first feature pattern and the second feature pattern. The method further includes presenting the suggestion of the LLM.

In general, in one aspect, one or more embodiments relate to a system. The system includes at least one computer processor, and a user application, executing on the at least one computer processor. The system further includes a feature clustering model, executing on the at least one computer processor. The system further includes an LLM, executing on the at least one computer processor. The system further includes a matching AI agent, executing on the at least one computer processor. The matching AI agent is configured for obtaining, from a matching model, for a user input, a set of candidate matches generated using a corresponding set of features. A candidate match of the set of candidate matches has a corresponding confidence score satisfying a range having a lower limit of a non-matching threshold and an upper limit of a strong-matching threshold. The matching AI agent is further configured for partitioning the corresponding set of features into a first feature subset and a second feature subset. The matching AI agent is further configured for individually generating, for each candidate match in the set of candidate matches, a candidate feature subset of features selected from the first feature subset and the second feature subset for the candidate match, to obtain a multitude of candidate feature subsets corresponding to the set of candidate matches. The matching AI agent is further configured for causing the feature clustering model to cluster the multitude of candidate feature subsets to obtain a first feature pattern and a second feature pattern. The matching AI agent is further configured for causing the LLM to generate a suggestion to modify the user input by processing the first feature pattern and the second feature pattern. The system is further configured for presenting the suggestion of the LLM in the user application.

In general, in one aspect, one or more embodiments relate to a method. The method includes obtaining a multitude of user profiles corresponding to a multitude of users of a user application. The method further includes clustering, by a user profile clustering model, the multitude of user profiles, based on a multitude of user features corresponding to the multitude of user profiles, to obtain a multitude of user categories. For a user category of the multitude of user categories, the method further includes determining, for the user category, a non-matching threshold based on candidate matches of user profiles of the user category. The method further includes determining, for the user category, a strong-matching threshold based on the candidate matches of the user profiles of the user category. The method further includes calculating impact values corresponding to features of the candidate matches of the user profiles of the user category, using an impact generation function. The method further includes determining confidence intervals of the impact values corresponding to the features of the candidate matches of the user profiles of the user category. The method further includes adding the confidence intervals, the non-matching threshold, and the strong-matching threshold to a user category profile of the user category. The method further includes obtaining, from a matching model, for a user input, a set of candidate matches generated using a corresponding set of features. The method further includes partitioning the corresponding set of features into a first feature subset and a second feature subset based on the confidence intervals of the user category profile. The method further includes individually generating, for each candidate match in the set of candidate matches, a candidate feature subset of features selected from the first feature subset and the second feature subset for the candidate match, to obtain a multitude of candidate feature subsets corresponding to the set of candidate matches. The method further includes clustering the multitude of candidate feature subsets to obtain a first feature pattern and a second feature pattern. The method further includes generating by a large language model (LLM), a suggestion to modify the user input by processing the first feature pattern and the second feature pattern. The method further includes presenting the suggestion of the LLM.

Other aspects of one or more embodiments will be apparent from the following description and the appended claims.

BRIEF DESCRIPTION OF DRAWINGS

Like elements in the various figures are denoted by like reference numerals for consistency.

DETAILED DESCRIPTION

One or more embodiments are directed to resolving ambiguous candidate matches, and providing explanations and suggestions towards the resolution of the ambiguity, in complex cross reference matching systems. When a computing system performs a search to find a matching result for an input, the computing system may obtain ambiguous candidate matches. The ambiguous candidate matches are matches that have a confidence score between a "non-matching" threshold and a "strong-matching" threshold. One or more embodiments are directed to determining the reason such candidate matches are ambiguous and changing the input to obtain better results.

To determine the reason such candidate matches are ambiguous, one or more embodiments first cluster the ambiguous candidate matches using the categorical features used during the matching process. Feature analysis is then performed on each cluster of candidate matches. The feature analysis includes determining the impact values of each feature with respect to the confidence score of the candidate matches. The confidence intervals of the impact value of the feature within each cluster are determined. Some of the features are identified as either "dominant" or "ambiguous" based on the confidence intervals. Both the dominant and ambiguous features of each cluster may be further analyzed to obtain the most frequently occurring dominant and ambiguous feature patterns of each cluster.

The dominant and ambiguous feature patterns of the cluster may be provided to a large language model (LLM) as a prompt input. The instruction of the prompt may direct the LLM to generate an explanation of the ambiguity of a feature, and thereupon to provide a suggestion for a specific modification of the input to resolve the search ambiguity. By providing the suggestion and receiving a modification, the matching process overall is thereby improved.

For example, consider the scenario of matching a set of bank transactions to a set of invoices (i.e., a type of input). The set of bank transactions may have identical amounts corresponding to diverse invoices. Thus, when the matching process attempts to match individual bank transactions to individual invoices, the result may be ambiguous candidate matches because the matching has low confidence scores. One or more embodiments, perform the clustering and feature analysis, described above, to identify the reason for the low confidence. Then, one or more embodiments provide a suggestion generated by the LLM to resolve the ambiguity. The suggestion may be to provide invoice numbers, invoice dates and vendor names, etc., in the invoices.

Figure 1:
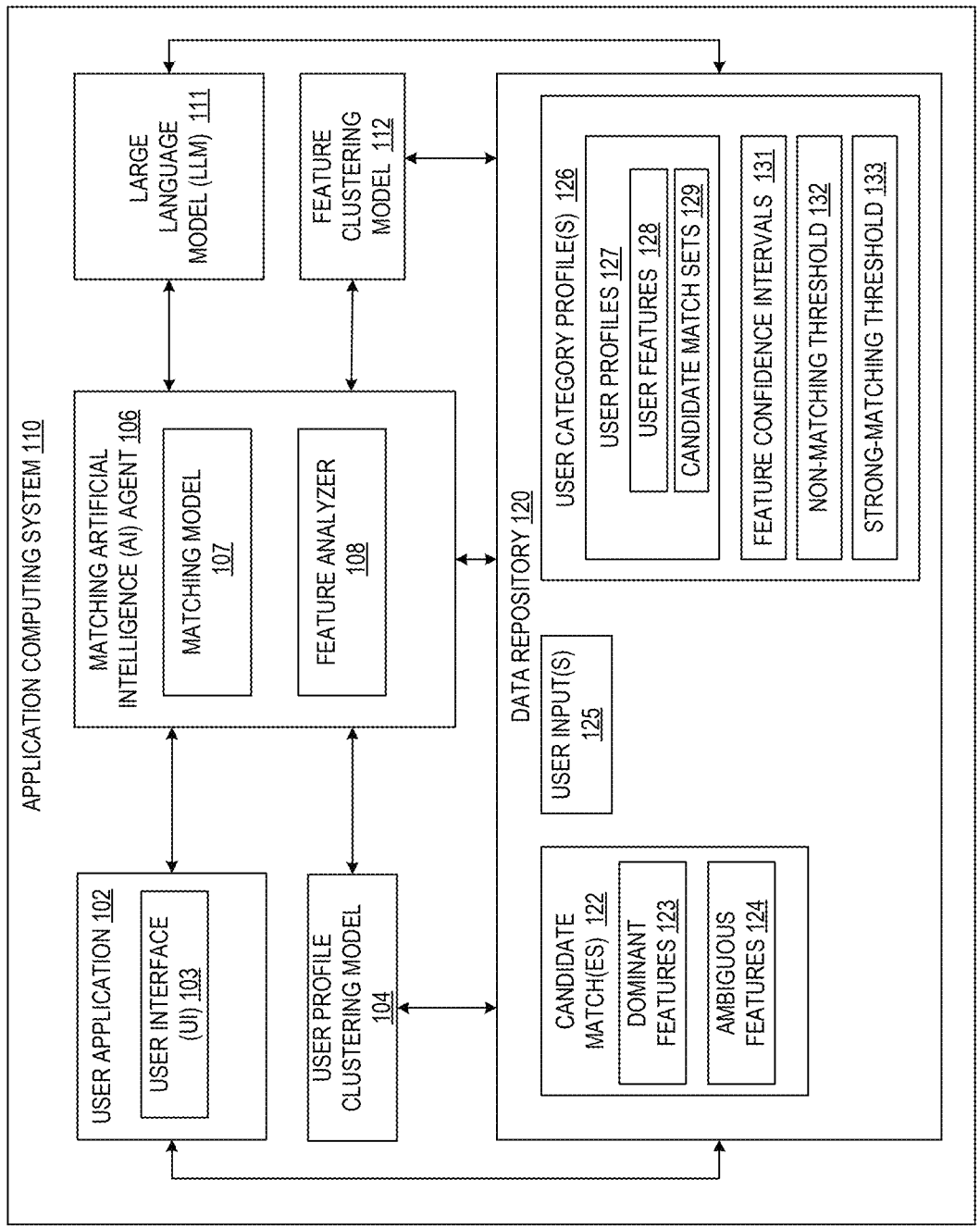
FIG. 1 shows a computing system, in accordance with one or more embodiments.

Attention is now turned to the figures. FIG. 1 shows a computing system, in accordance with one or more embodiments. The system shown in FIG. 1 may include an application computing system (110). The application computing system (110) is one or more computer processors, data repositories, communication devices, and supporting hardware and software. The application computing system (110) may be in a distributed computing environment. The application computing system (110) includes a computer processor. The computer processor is one or more hardware or virtual processors which may execute computer readable program code that defines one or more applications, such as the user application (102), the user profile clustering model (104), the matching artificial intelligence (AI) agent (106), the LLM (111), or the feature clustering model (112). An example of the computer processor is described with respect to the computer processor(s) (502) of FIG. 5A. Thus, the application computing system (110) is configured to execute one or more applications, such as the user application (102), the user profile clustering model (104), the matching AI agent (106), the LLM (111), or the feature clustering model (112). An example of a computer system and network that may form the application computing system (110) is described with respect to FIG. 5A and FIG. 5B.

Some terms as used in the specification are described herein. A search target is the input on which a search is performed. Namely, a search target is the object or data for which a match is sought, from a collection of information. A candidate match is a search result corresponding to the search target. More particularly, a candidate match is a search result that is a cross-reference corresponding to the search target. The search target serves as the reference point or query against which potential matches (i.e., candidate matches) are evaluated. As a cross-reference, a candidate match may be potentially linked to the search target through indirect or inferred associations, instead of direct textual or semantic similarity. The associations between a candidate match and the search target may be established through temporal proximity, certain feature similarity, reference or entity field matching, etc. Matching of a candidate match to a search target may be inferred through a mapping or linking process, instead of direct content comparison. Multiple candidate matches may be ranked using confidence scores. Thus, the term "match" as used in the current specification indicates a cross-reference type corresponding to the search target instead of content similarity. For example, a match and the input may be matching because both the match and the input are related to a same real world or virtual entity even though the content match and the input are wholly or in a large part non-matching.

Confidence scores of candidate matches are numerical values that represent the likelihood that a given candidate match is a cross-reference that correctly corresponds to the search target. Thus, a candidate match that is a strong match for the search target may have a confidence score that satisfies or exceeds a "strong-matching" confidence score threshold. A candidate match with a confidence score that is less than a "non-matching" confidence score threshold may be discarded as irrelevant. However, some candidate matches may have confidence scores that are within a range defined by a lower limit of the non-matching confidence score threshold, and an upper limit of the strong-matching confidence score threshold. These candidate matches may be considered to be "ambiguous" or "confusing" candidate matches, on account of the fact that the system may be unable to discern distinguishing characteristics of these candidate matches that would resolve the candidate match to be a strong match.

Confidence scores may be generated by an algorithm or model that evaluates various features or criteria to assess the quality or relevance of the match. Features of a candidate match are the measurable or identifiable attributes used to evaluate how well the candidate corresponds to the search target. Features may be inputs for computing confidence scores and evaluating match quality. Categorical features may represent discrete categories or groups. Categorical features may describe characteristics that can be divided into distinct classes.

When analyzing features of a candidate match, dominant and confusing features may be identified. A dominant feature may have an impact value of high magnitude that positively influences the confidence score of a candidate match. Conversely, a "confusing" or "ambiguous" feature may have an impact value of high magnitude that negatively influences the confidence score of a candidate match. An impact value of a feature refers to the quantitative contribution that a specific feature makes to a model's confidence score for a given candidate match. Confidence intervals may be used to further assess the quantitative contribution of an impact value. A confidence interval for a feature's impact value quantifies the uncertainty or variability in that feature's contribution to the model's confidence score of a candidate match, across different samples or under different conditions.

Thus, both candidate matches, and certain features of the candidate matches may be characterized as "ambiguous" or "confusing."

The system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

The data repository (120) includes one or more candidate matches (122). The candidate matches (122) are the search results with respect to a search target, provided as input. In one or more embodiments, the candidate matches (122) are cross-referencing results obtained in a cross-referencing search against the provided search target, or user input. For example, a record of a patient visit to a hospital may be provided as the search target, with a request to cross-reference the record of the patient visit to transactions of payments made by the patient to the hospital. Multiple procedures may be performed on the patient, costing multiple sums of money. The sums of money owed may be used as one input to cross-reference payment transactions from the particular patient.

A candidate match (122) further includes dominant features (123), and ambiguous features (124). The terms "ambiguous features" and "confusing features" may be used interchangeably in the current specification. The dominant features (123) of a candidate match may contribute positively to an overall confidence score of the candidate match (122). Specifically, the dominant features (123) are more dispositive of a match than non-dominant features. For example, if the candidate match is a bank transaction from a patient, then the patient name, and the transaction amount may contribute positively to the overall confidence score of the candidate match (122). Thus, the patient name and the transaction amount may be dominant features (123) of the candidate match (122). On the other hand, if multiple procedures were repeatedly performed on the patient, such as administration of a particular interventional drug, and the cost was the same per administration, then the transaction amount may not prove to be a positively contributing feature to the overall confidence score of the candidate match (122). Instead, the transaction amount may be an ambiguous feature (124) of the candidate match (122). Examples of data storage for features include data frames, feature vectors, key-value dictionaries, etc.

The data repository (120) further includes user input(s) (125). The user inputs (125) are search targets of the application computing system (110). For example, the user input (125) may be an invoice, for which a matching bank transaction is sought. In another example, the user input may be a course schedule of a student, for which the transcript of the student is sought. A third example may be an invoice of a business concern, for which a payment transaction is sought.

The data repository (120) further includes one or more user category profiles (126). A user category profile (126) is a collection of user profiles (127) having common characteristics or features. A user profile (127) is a collection of specific characteristics of a user. A user profile (127) may be characterized by one or more user features (128). A user feature (128), similar to a feature of a candidate match (122), is a measurable or identifiable attribute that characterizes a user. User category profiles (126) and user profiles (127) represent characteristics of the userbase of the user application (102).

When the application computing system (110) is deployed, the user application (102) may have a userbase of several users. The user base of the user application (102) may include user groups from different business domains or industry verticals. Thus, diverse user groups of the user base may interact with the user application (102) in diverse ways. The process for resolving ambiguous candidate matches may be specifically configured for diverse user groups. To this end, the user base may be clustered into diverse user categories, based on user features, for example, industry type, customer base size, usage period of the user application, etc. The user base may be clustered into diverse user categories by the user profile clustering model (104). Thus, a user category represents a cluster generated by the user profile clustering model (104). Further, associated with each user profile, past candidate matches, or sample candidate matches obtained in previous interactions of a user with the user application may be included. The past or sample candidate matches are shown as the candidate match sets (129) corresponding to a user profile (127), in FIG. 1.

Certain parameters used in the process for resolving ambiguous candidate matches are further included in a user category profile (126). The parameters may include feature confidence intervals (131), corresponding to candidate match features. Further, for a given user category, the confidence thresholds for non-matching candidate matches and strong-matching candidate matches may be individualized. Thus, the user category profile (126) further includes a non-matching threshold (132) and a strong-matching threshold (133).

Thus, diverse users of the user base of the user application (102) may be clustered into one or more user categories. User profiles (127) of the users of a user category may be included in a user category profile (126). A user profile (127) of a user category profile (126) may further include one or more user features (128). Notably, the user profiles (127) included in a particular user category profile (126) may have certain common user features (128). Additionally, a user profile (127) may further include one or more candidate match sets (129). The candidate match sets (129) may be candidate matches obtained by the user corresponding to the user profile (127). The candidate match sets (129) of the user profiles (127) of a user category profile (126) may be aggregated and processed to obtain feature confidence intervals (131), non-matching threshold (132), and strong-matching threshold (133) specific to the user category profile (126).

The application computing system (110) further includes a user profile clustering model (104). The user profile clustering model (104) is an unsupervised machine learning model that is used to cluster one or more user profiles (127) corresponding to users of the user base of the user application (102), into user categories. In one or more embodiments, the user profile clustering model (104) may be a K-modes clustering model. Other clustering models may be used without departing from the scope of the invention.

As a general overview, K-modes clustering is an unsupervised machine learning algorithm used for clustering categorical data. K-modes clustering is an extension of the K-means algorithm. However, K-modes uses modes (the most frequent category) to represent the center of a cluster rather than mean. Further, K-modes clustering uses a simple matching dissimilarity measure (i.e., the number of mismatches between categorical attributes) instead of Euclidean distance. Accordingly, each data point (in this case, a user profile) is assigned to the cluster whose mode is most similar i.e., has the fewest mismatches. After assigning all points, the mode of each cluster is updated based on the most frequent occurrence of a feature, or combination of features, of the data points of the cluster. Configuring the K-modes clustering model may entail selecting the number of clusters into which the input data points may be clustered. The number of clusters may be selected using a cost function, which is the elbow method for categorical data, silhouette scores for categorical data using Hamming distance, or simple matching dissimilarity, etc.

The application computing system (110) further includes a feature clustering model (112). The feature clustering model (112) is an unsupervised machine learning model, which is used to cluster the candidate matches obtained as search results corresponding to a user input. Clustering the candidate matches may be a step of the process for resolving ambiguous candidate matches included in the search results. Similar to the user profile clustering model (104), the feature clustering model (112) may be a K-modes clustering model, in one or more embodiments.

The application computing system (110) further includes an LLM (111). The LLM is a machine learning model having a deep neural network architecture, typically based on transformer models. LLMs are trained on large-scale textual datasets to learn statistical patterns in natural language. LLMs may be configured to perform one or more natural language processing tasks, including but not limited to text generation, summarization, translation, and question answering, by generating contextually relevant outputs based on input sequences. Examples of LLMs include ChatGPT®, Anthropic AI's Claude®, Meta's Llama®, etc.

The application computing system (110) further includes a matching AI agent (106). The matching AI agent (106) is software or application-specific hardware, which, when executing on the computer processor, may perform the method of FIG. 2. The matching AI agent (106) may further control, and coordinate operation of the software or application specific hardware described herein. Thus, the matching AI agent (106) may control and coordinate execution of the LLM (111), the feature clustering model (112), and the user profile clustering model (104).

As a general overview, AI agents are computer-implemented entities that may include one or more machine learning models, rule-based systems, or a combination thereof, configured to autonomously or semi-autonomously perform tasks that typically require human intelligence. AI agents may receive input data, process the data using computational logic or learned patterns, and generate contextually relevant outputs to support decision-making or task execution.

Accordingly, in one or more embodiments, the matching AI agent (106) may be configured to identify, associate, and resolve contextually related cross-reference search results of a search target. The matching AI agent (106) further includes a matching model (107) and a feature analyzer (108). The matching AI agent (106) may further be configured to use the LLM (111) to interpret, contextualize, and resolve candidate matches based on feature analysis. For example, the matching AI agent (106) may prompt the LLM with feature patterns of ambiguous candidate matches, instructing the LLM (111) to generate explanations of the ambiguity embodied in the candidate matches. Further, the LLM (111) may be instructed to generate recommendations to modify the search target to include specific features.

The matching model (107) is a machine learning model that generates cross-reference search results for a given user input. The matching model (107) may be a machine learning model based on diverse architectures and/or matching algorithms. In one embodiment, the matching model (107) may be a transformer model such as Bidirectional Encoder Representations from Transformers (BERT), Robustly Optimized BERT Approach (ROBERTa), or Long Document Transformer (Longformer). In another embodiment, the matching model (107) may be a cross-encoder model. In other embodiments, the matching model (107) may be based on a Siamese, or Triplet networks architecture. In certain configurations, the matching model (107) may be a subsystem including a search engine such as Elasticsearch, or Apache Lucene, combined with embedding models such as Sentence-BERT or Contextualized Late Interaction over BERT (ColBERT). The feature analyzer (108) is software or application-specific hardware, configured to extract feature patterns of the candidate matches of a cluster of candidate matches generated by the feature clustering model (112). The feature analyzer (108) may extract combinations of frequently occurring dominant features and confusing, or ambiguous features of the candidate matches in a cluster.

The application computing system (110) further includes a user application (102). In one or more embodiments, the user application (102) may be a web-based client application, operating within a web browser. Other embodiments of the user application (102) may include native desktop applications, mobile applications, remote desktop clients, etc. The user application (102) includes a user interface (UI) (103). The search target may be provided via the UI (103) by a user inputting the search target for the cross-reference search. The UI (103) may further be configured to present suggestions and recommendations generated by the LLM (111) to add further attributes to the search target to resolve the ambiguous candidate matches obtained in a search against the search target.

While FIG. 1 shows a configuration of components, other configurations may be used without departing from the scope of one or more embodiments. For example, various components may be combined to create a single component. As another example, the functionality performed by a single component may be performed by two or more components.

Figure 2:
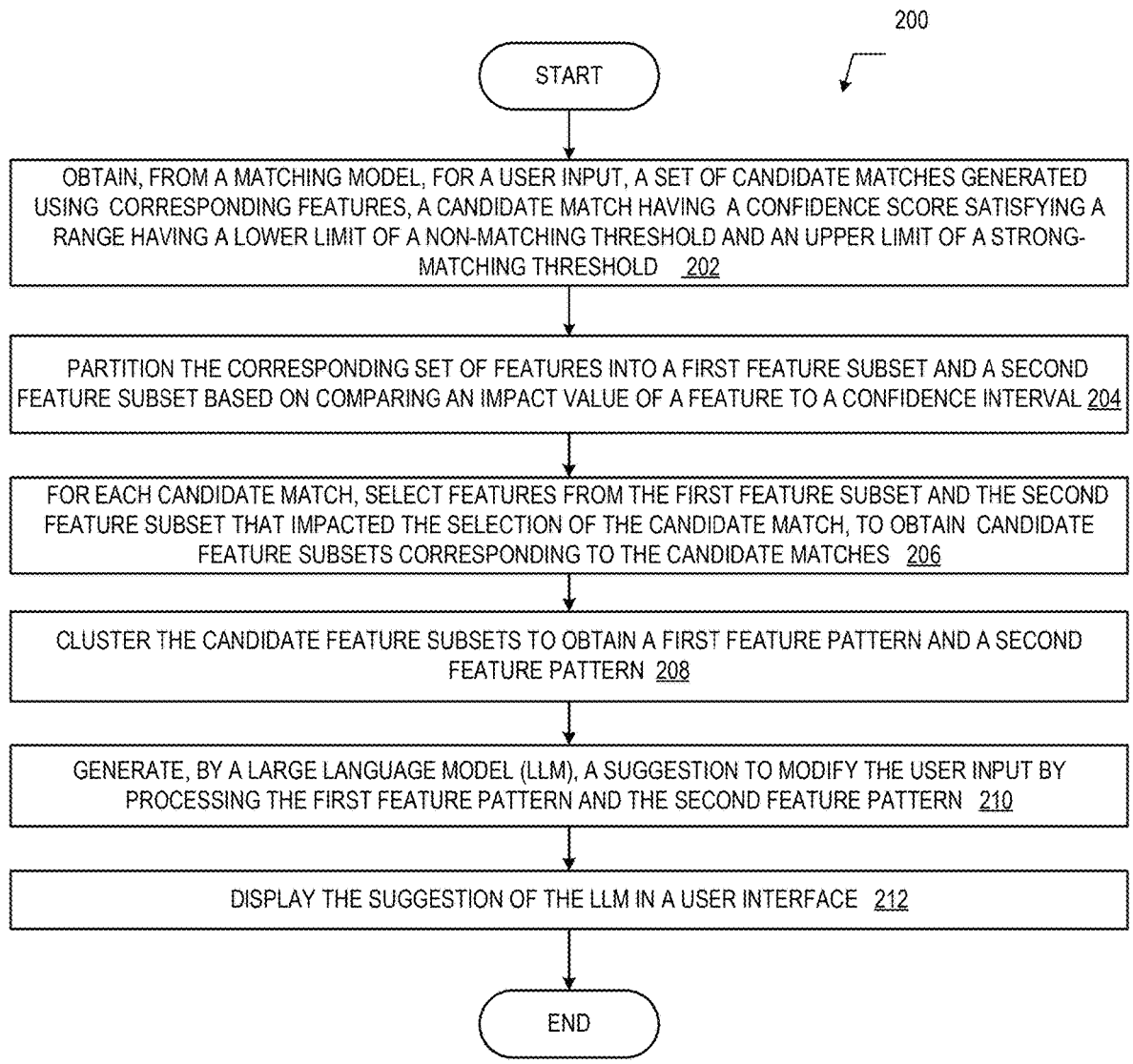
FIG. 2 shows a flowchart of a method, in accordance with one or more embodiments.

FIG. 2 shows a flowchart 200 of a method for resolving ambiguous candidate matches of a user input, in accordance with one or more embodiments. The method of FIG. 2 may be implemented using the system of FIG. 1 and one or more of the steps may be performed on or received at one or more computer processors. While the various steps in the flowchart 200 are presented and described sequentially, at least some of the steps may be executed in different orders, may be combined or omitted, and at least some of the steps may be executed in parallel. Furthermore, the steps may be performed actively or passively.

In Block 202, a set of candidate matches generated using a corresponding set of features is obtained from a matching model for a user input. In one or more embodiments, the set of candidate matches may include candidate matches having corresponding confidence scores, that satisfy a range. The range may have a lower limit of a non-matching threshold and an upper limit of a strong-matching threshold. In one or more embodiments, the matching model may process the user input to generate candidate matches. The candidate matches may be cross-referencing results. The cross-referencing results may be selected by the matching model based on a multitude of features of the cross-referencing results. A portion of the features of the cross-referencing results may match, in part, a portion of features of the user input. For example, if the user input is an invoice having a date, a cross-referencing result may be a payment transaction having the same date.

In one or more embodiments, the user input may originate from a user associated with a particular user profile. The user profile may be matched by the matching model to a user category having similar user profiles. A detailed description of user profiles and user categories are provided in reference to the method of FIG. 3. The matched user category may have a user category profile that includes confidence intervals of impact values of features of sets of candidate matches, non-matching thresholds, and strong-matching thresholds. Thus, when a user input is received, the criteria for resolving the candidate matches are retrieved from a user category that matches a user profile of the user providing the user input. The candidate matches may be generated by the matching model. A candidate match may have a corresponding confidence score. If the confidence score of a candidate match is less than the non-matching threshold retrieved from the user category profile, the matching engine may return a message to the user application indicating that there was no match. If the confidence score of a candidate match is higher than the strong-matching threshold retrieved from the user category, the matching engine may return the candidate match as the cross-referencing result. On the other hand, if the confidence score of a candidate match falls in a range between the non-matching threshold and the strong-matching threshold, the steps of Blocks 204-212 of FIG. 2 are performed to resolve the "confusing" or "ambiguous" candidate matches.

A goal of the method of FIG. 2 is to identify features that positively or negatively impact the confidence score of a candidate match. To this end, in one or more embodiments, SHapley Additive explanation (SHAP) values may be calculated as impact values of the features of the corresponding matches. The impact values may then be compared to confidence intervals (CI) retrieved from the user category profile. An impact value falling within the corresponding Cl or above the upper limit of the Cl, is considered a positive indicator since it indicates that the feature has a similar or greater effect on the confidence score of the candidate match. Conversely, an impact value that falls below the lower limit of the corresponding Cl is considered a negative indicator. Other functions may be used to calculate the impact value.

Accordingly, in Block 204, the corresponding set of features is partitioned into a first feature subset and a second feature subset. The partitioning of the corresponding set of features is based on comparing an impact value of a feature to a confidence interval. In one or more embodiments, the confidence interval of the feature may be obtained from a user category profile. The user category profile may correspond to a user category including a multitude of user profiles. Obtaining confidence intervals and calculating impact values of features is described in further detail in reference to the method of FIG. 3.

In one or more embodiments, partitioning the corresponding set of features may include obtaining a confidence interval of an individual feature of the corresponding set of features. Further, an impact value of the feature may be determined, using an impact generation function. Responsive to the impact value of the feature satisfying or exceeding the confidence interval, the feature may be added to the first feature subset. Responsive to the impact value of the feature falling below the lower limit of the confidence interval, the feature may be added to the second feature subset.

Thus, the first feature subset may be considered to include the "dominant" or reinforcing features of the candidate matches. The dominant features may align and positively contribute to the overall confidence, or matching, scores of the candidate matches. The second feature subset may be considered to include the "confusing", or undermining, or ambiguous features of the candidate match. The confusing features may negatively, or ambiguously contribute to the overall confidence or matching scores of the candidate matches.

In Block 206, for each candidate match, features are selected from the first feature subset and the second feature subset that impacted the selection of the candidate match, to obtain candidate feature subsets corresponding to the candidate matches. In one or more embodiments, a candidate feature subset of features selected from the first feature subset and the second feature subset for a candidate match is generated. The candidate feature subset for a candidate match may be individually generated for each candidate match in the set of candidate matches. In this manner, a multitude of candidate feature subsets corresponding to the set of candidate matches may be obtained.

In one or more embodiments, selection of features from the first feature subset may entail determining corresponding z-score values of respective impact values of features of the first feature subset. Further, top-k features of the first feature subset having top-k z-score values may be selected. K may be a predefined number, for example, 5. The top-k features of the first feature subset may be added to the candidate feature subset. Top-k refers to the selection of the k highest-ranked items from a larger set, based on a specific scoring or ranking criterion. Given a set of items and a function that assigns a score to each item, the top-k items are those with the k largest scores. Selection of top-k items is a technique in data analysis, machine learning, and information retrieval to identify the most relevant, important, or significant elements according to the chosen metric.

In a similar manner, corresponding z-score values of respective impact values of features of the second feature subset may be determined. Further, bottom-k features of the second feature subset having bottom-k z-score values may be selected. K may be a predefined number, for example, 5. The bottom-k features of the second feature subset may be added to the candidate feature subset. Bottom-k refers to the selection of the k lowest-ranked items from a larger set, based on a specific scoring or ranking criterion. Given a set of items and a function that assigns a score to each item, the bottom-k items are those with the k smallest scores. Selection of bottom-k items is a technique to identify the least relevant, least significant, or most anomalous elements according to the chosen metric.

As known in the field of statistics, a z-score (also known as a standard score) is a statistical measurement that describes a value's relationship to the mean of a group of values, in terms of standard deviations. A z-score of a value x may be calculated in accordance with Equation 1:

$$z = \frac{x - \mu}{\sigma} \quad (1)$$

In Equation (1), x is the value being standardized, μ is the mean of the dataset, and σ is the standard deviation of the dataset.

In applying the z-score calculation to the impact values of the features of the first feature subset, and the second feature subset, the z-scores for the impact values of the features may be calculated in accordance with Equation (2):

$$z_{score}(\text{feature}) = \frac{currImpactValue - meanImpactValue}{(Std(ImpactValue))/\sqrt{N}} \quad (2)$$

In Equation (2), currImpactValue is the impact value of the feature, meanImpactValue is the mean impact value of the feature with respect to the multitude of candidate matches, Std (ImpactValue) is the standard deviation of the impact value of the feature with respect to the multitude of candidate matches, and N is the number of candidate matches. In one or more embodiments, the current impact value may be a SHAP value of the feature.

To determine the features contributing to confusion or dominance in candidate matches, feature patterns may be analyzed as a whole. To this end, each candidate may be expressed through the dominant and ambiguous features previously identified.

Figure 4:
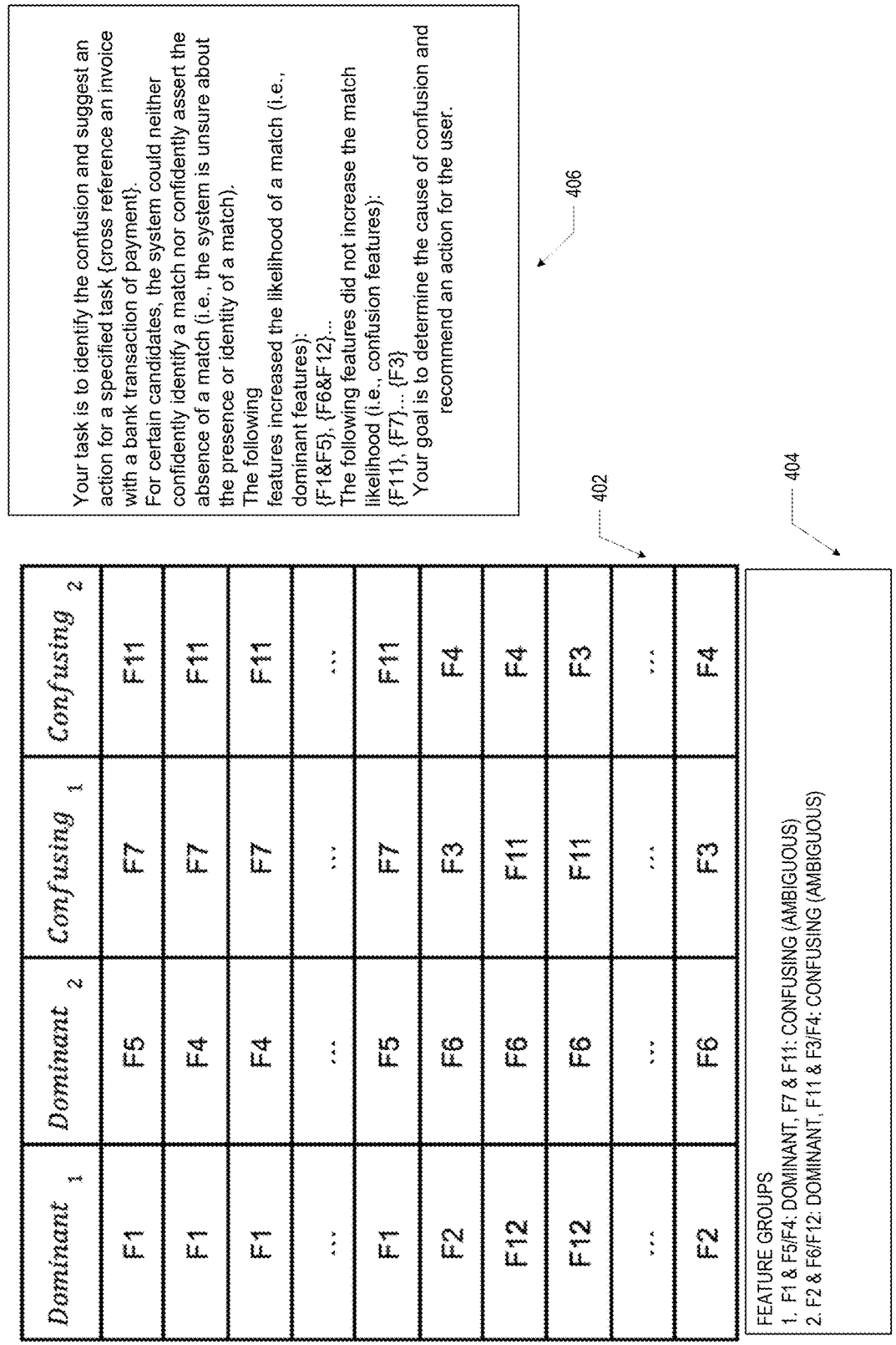
FIG. 4 shows an example of a tabular model of dominant and confusing features of a set of candidate matches, in accordance with one or more embodiments.

Accordingly, in Block 208, the candidate feature subsets are clustered to obtain a first feature pattern and a second feature pattern. In one or more embodiments, the feature clustering model of FIG. 1 may be used to cluster the candidate feature subsets. Further, a most frequently occurring first feature pattern of the multitude of clusters of candidate feature subsets may be determined. A first feature pattern may be thus obtained. The first feature pattern may include at least one dominant feature. In a similar manner, a most frequently occurring second feature pattern of the multitude of clusters of candidate feature subsets may be determined. The second feature pattern may be thus obtained. The second feature pattern may include at least one ambiguous feature. An example of feature patterns is shown in FIG. 4. Notably, at least a first feature pattern and a second feature pattern may be identified. In other words, further identification of other feature patterns is possible. In one or more embodiments, K feature patterns may be identified, wherein K is a configurable pre-defined number.

In one or more embodiments, the feature clustering model may identify the important clusters of dominant and confusing features. Further, the patterns that exist within the candidate features may be ascertained. The cluster modes may be designated as the "confusing" patterns. A cluster mode of a cluster of categorical features serves as the cluster "centroid" and is the most frequently occurring categorical feature(s) of the cluster. The cluster modes may facilitate identification of features causing the ambiguity of the candidate match.

In Block 210, the LLM generates a suggestion to modify the user input by processing the first feature pattern and the second feature pattern. In one or more embodiments, the LLM may be prompted to generate a suggestion to modify the user input. The prompt may include the first feature pattern as a first input, with descriptions pointing out that the first feature pattern includes dominant features that reinforce, or contribute positively to the overall confidence score of the candidate matches. Further, the prompt may include the second feature pattern as a second input, with a description indicating that the second feature pattern includes ambiguous ("confusing") features that undermine, or contribute negatively to the overall confidence score of the candidate matches. The prompt may additionally include instructions to the LLM to determine the cause of the overall candidate scores of the (low confidence) candidate matches based on the first and second feature patterns. Further the prompt may instruct the LLM to recommend an action to modify the user input as a suggestion.

In Block 212, the suggestion of the LLM is displayed in a user interface. The user interface may be part of a user application from which the user input originates. In one or more embodiments, a modified user input in accordance with the suggestion may be received via the user interface. Further, a match for the modified user input may be generated by the matching model. The match is a cross-reference result that satisfies the modified user input. The cross-reference result may further be stored in a storage device.

Figure 3:
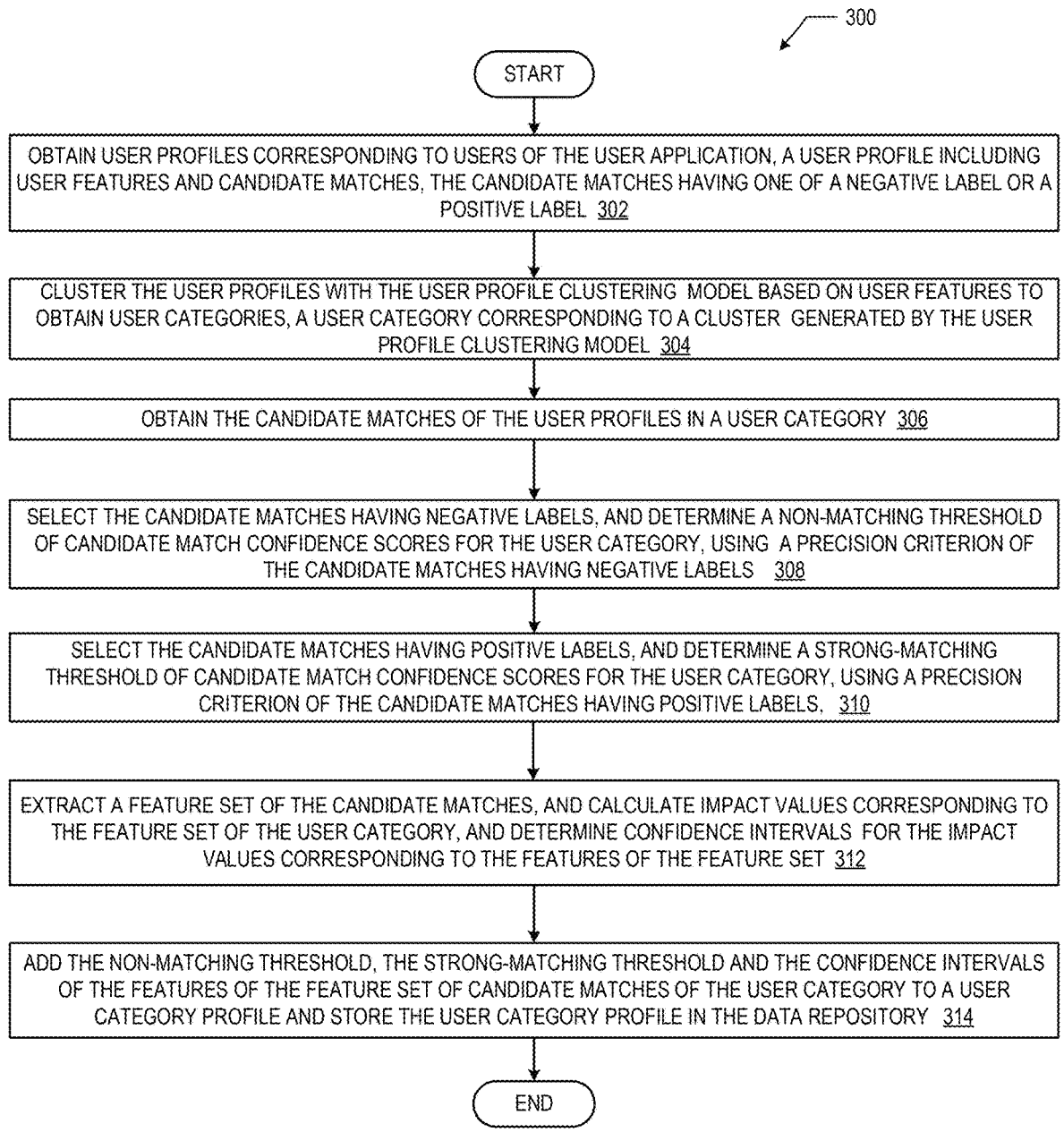
FIG. 3 shows a flowchart of a method, in accordance with one or more embodiments.

FIG. 3 shows a flowchart 300 of a method for determining confidence intervals of impact values of features. The method of FIG. 3 may be implemented using the system of FIG. 1 and one or more of the steps may be performed on or received at one or more computer processors. While the various steps in the flowchart 300 are presented and described sequentially, at least some of the steps may be executed in different orders, may be combined or omitted, and at least some of the steps may be executed in parallel. Furthermore, the steps may be performed actively or passively.

In Block 302, user profiles corresponding to users of the user application are obtained. A user profile may include user features and candidate matches. The candidate matches may be historical cross-referencing results presented to a user in previous interactions with the user application. Further, the candidate matches corresponding to a user profile may include corresponding labels. The labels may be positive labels, indicating that a particular candidate match was a strong match. The labels may further include negative labels, indicating that a particular candidate match was not, in fact, a match. Thus, a candidate match may be labeled with one of a negative label or a positive label. The user features may include categorical demographic features of a user, such as industry domain of a user, size of a user population corresponding to the industry domain, how long the user has been a user of the user application, etc.

In Block 304, the user profiles are clustered by a clustering model, based on the user features. In one or more embodiments, the clustering model may be the user profile clustering model of FIG. 1. A multitude of user categories may be obtained. The clusters of user profiles generated by the user profile clustering model constitute the user categories. In other words, a user category corresponds to a cluster of users, the cluster having been generated by the user profile clustering model.

In Block 306, the candidate matches of the user profiles in a user category are obtained. For example, a user category, which is a cluster of user profiles may include five user profiles. The five respective user profiles may have 10, 17, 15, 12, and 9 candidate matches respectively. Thus, the number of candidate matches (of the users) in the user category is 10+17+15+12+9, i.e., 63.

In Block 308, the candidate matches having negative labels are selected. Further, a non-matching threshold of candidate match confidence scores is determined for the user category. The non-matching threshold may be determined using a precision criterion of the confidence scores of the candidate matches having negative labels. The precision criterion for the non-matching threshold is a measure of the proportion of the correctly labeled negatively-labeled candidate matches out of all the negatively-labeled candidate matches. A high precision criterion may indicate that a high proportion of negatively-labeled candidate matches are accurately labeled with negative labels. In one or more embodiments, the non-matching threshold may be determined for the user category by selecting the candidate matches of the user profiles of the user category having negative labels to obtain selected negative candidate matches. Further, the non-matching threshold may be set, based on the precision criterion of the selected negative candidate matches.

In Block 310, the candidate matches having positive labels (i.e., positively-labeled candidate matches) are selected. Further, a strong-matching threshold of candidate match confidence scores is determined for the user category, using a precision criterion of the candidate matches having positive labels. In the case of a strong-matching threshold, the precision criterion is a measure of the proportion of correctly labeled positively-labeled candidate matches out of all the positively-labeled candidate matches. A high precision criterion may indicate that a high proportion of positively-labeled candidate matches are accurately labeled with positive labels. In one or more embodiments, a strong-matching threshold may be determined for the user category by selecting the candidate matches of the user profiles of the user category having positive labels to obtain selected positive candidate matches. Further, the strong-matching threshold may be set, based on a precision criterion of the selected positive candidate matches.

In Block 312, the features of the candidate matches of the user profiles of the user category are extracted. Further, impact values corresponding to the feature set of the user category are calculated. Furthermore, confidence intervals for the impact values corresponding to the features of the feature set are determined. In one or more embodiments, features of the candidate matches of the user profiles of the user category may be extracted. Further, the impact values corresponding to the features of the candidate matches of the user profiles of the user category are calculated using an impact generation function. Further, the confidence intervals of the impact values corresponding to the features of the candidate matches of the user profiles of the user category may be determined.

As a general overview, an impact value of a feature of an output of a machine learning model is a numerical measure of how much influence a feature has on the outcome of a model, either increasing or decreasing the predicted value, relative to a baseline. Stated another way, the impact value of a feature is the quantified contribution of the feature to the prediction made by a machine learning model. The impact value may be measured by how much the feature shifts the model's output from the average prediction.

In one or more embodiments, the impact value of a feature may be determined by an impact generation function. In one or more embodiments, the impact generation function may be a SHAP value. In this case, the impact value of a feature is the magnitude of its SHAP value for a specific prediction. A positive SHAP value indicates that the feature increased the prediction relative to the average prediction. A negative SHAP value indicates that the feature decreased the prediction. Other impact generation functions are possible.

In one or more embodiments, the confidence intervals of the impact values may be determined in accordance with Equation (3):

$$CI := \text{mean}(SHAP) \pm Z \times \frac{Std(SHAP)}{\sqrt{N}} \quad (3)$$

In Equation (3), CI is the confidence interval of the SHAP values for a feature of the candidate matches of the user category, mean (SHAP) is the mean of the SHAP (impact) values of the feature across the candidate matches with positive labels. Further, Z is the z-score of the feature across the candidate matches with positive labels. Further, Std (SHAP) is the standard deviation of the SHAP value of the feature across the candidate matches with positive labels, and N is the number of candidate matches with positive labels.

In Block 314, the non-matching threshold, the strong-matching threshold, and the confidence intervals of the features of the feature set of candidate matches of the user category are added to a user category profile. Further, the user category profile is stored in the data repository. In one or more embodiments, a multitude of user category profiles corresponding to the multitude of user categories may be obtained in this manner.

FIG. 4 shows an example of a tabular model of top-k and bottom-k features of a set of candidate matches, in accordance with one or more embodiments. The following example is for explanatory purposes only and not intended to limit the scope of one or more embodiments.

In FIG. 4, Block 402 shows a tabular representation of a candidate matches in terms of top-k (K=2) features, shown as $Dominant_1$ and $Dominant_2$, and bottom-k features, shown as $Confusing_1$ and $Confusing_2$. Block 404 shows the identified feature patterns. Two combinations of dominant and confusing feature patterns are identified. In the first group, F1, F5, and F4 are dominant features, while F7 and F11 are ambiguous features. In the second group, F2 and F6/F12 are dominant, while F11 and F3/F4 are ambiguous.

Block 406 shows an example of a prompt provided to the LLM, using the dominant and confusing feature patterns obtained from the tabular model of Block 402.

As an example, in cross-referencing bank transactions to invoices, a set of candidate matches may be characterized by dominant features, such as similar amounts and dates, and confusing features like missing customer names on the invoices. When prompted with the dominant and confusing features, the LLM may identify that the confusion arises because multiple candidates appear relevant based on amounts and dates but lack distinguishing evidence due to missing customer names. The LLM may then generate a suggestion that the user include textual data, such as customer names, on invoices. The additional data may be utilized by the matching system to accurately identify the correct match in the future. The matching AI agent may dedicate an agentic workflow to converting the suggestions provided by the LLM, which focus on clarifying confusion, into executable actions within the user application.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
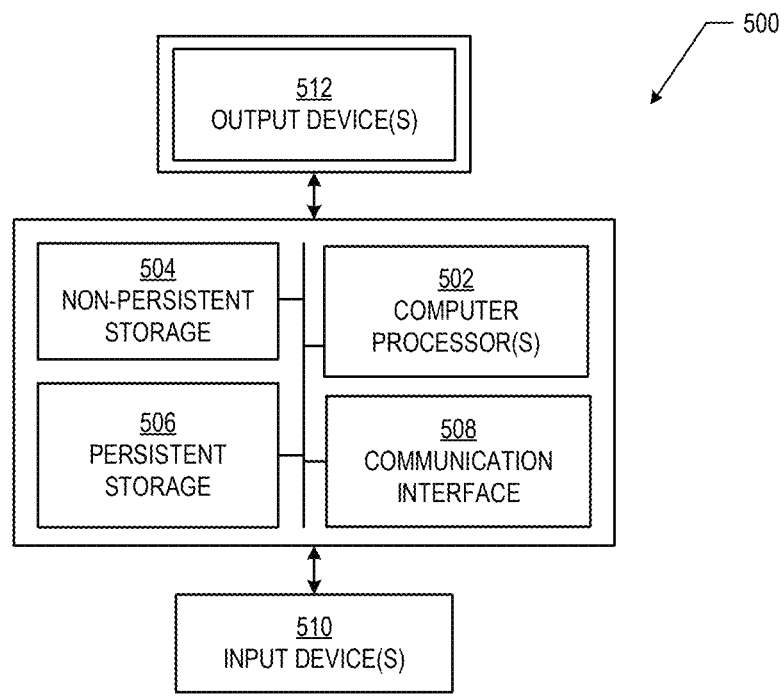
FIGS. 5A and 5B show a computing system, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or microcores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN), such as the Internet, mobile network, or any other type of network) or to another device, such as another computing device, and combinations thereof.

Further, the output device(s) (512) may include a display device, a printer, external storage, or any other output device. One or more of the output device(s) (512) may be the same as or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
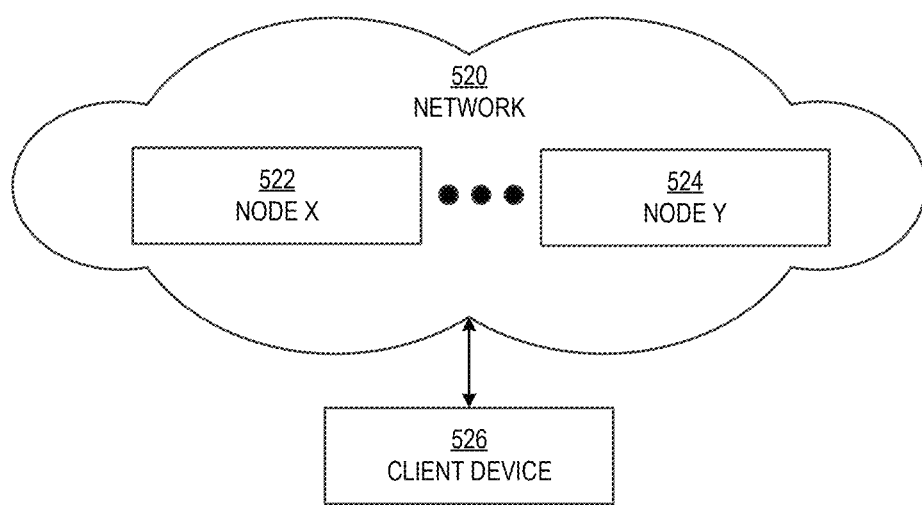

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method, comprising:
    cross-referencing, by a matching model, a set of features of a user input having a first document type with a set of candidate matches having at least a second document type different from the first document type;
    partitioning, using a set of corresponding confidence scores of the set of candidate matches, the set of features into a dominant feature subset and an ambiguous feature subset based on the dominant feature subset increasing the set of corresponding confidence scores and the ambiguous feature subset decreasing the set of corresponding confidence scores;
    individually generating, for each candidate match in the set of candidate matches, a corresponding candidate feature subset of features selected from the dominant feature subset and the ambiguous feature subset for the candidate match, to obtain a plurality of candidate feature subsets;
    clustering the plurality of candidate feature subsets to obtain a dominant feature pattern and an ambiguous feature pattern;
    generating by a large language model (LLM), a suggestion to modify the user input by processing the dominant feature pattern and the ambiguous feature pattern; and
    presenting the suggestion of the LLM.

2. The method of claim 1, further comprising:
    displaying the suggestion of the LLM in a user interface;
    receiving, via the user interface, a modified user input in accordance with the suggestion;
    generating, by the matching model, a match for the modified user input, wherein the match is a cross-referencing result that satisfies the modified user input; and
    storing the cross-referencing result in a storage device.

3. The method of claim 1, wherein:
    the set of candidate matches comprises candidate matches having corresponding confidence scores satisfying a range having a lower limit of a non-matching threshold and an upper limit of a strong-matching threshold.

4. The method of claim 1, wherein partitioning the corresponding set of features further comprises:
    for a feature of the set of features,
        obtaining a confidence interval of the feature,
        determining an impact value of the feature, and
        responsive to the impact value of the feature satisfying or exceeding the confidence interval, adding the feature to the dominant feature subset.

5. The method of claim 4, wherein:
    the confidence interval of the feature of the corresponding set of features is obtained from a user category profile, and wherein the user category profile corresponds to a user category comprising a plurality of user profiles.

6. The method of claim 4, wherein partitioning the corresponding set of features further comprises:
    responsive to the impact value of the feature falling below the confidence interval, adding the feature to the ambiguous feature subset.

7. The method of claim 1, wherein generating the candidate feature subset further comprises:
    determining corresponding z-score values of respective impact values of features of the dominant feature subset,
    selecting top-k features of the dominant feature subset having top-k z-score values, wherein k is a predefined number, and
    adding the top-k features of the dominant feature subset to the candidate feature subset.

8. The method of claim 1, wherein generating the candidate feature subset further comprises:
    determining corresponding z-score values of respective impact values of features of the ambiguous feature subset,
    selecting bottom-k features of the ambiguous feature subset having bottom-k z-score values, wherein k is a predefined number, and
    adding the bottom-k features of the ambiguous feature subset to the candidate feature subset.

9. The method of claim 1, wherein obtaining the dominant feature pattern further comprises:
    clustering the plurality of candidate feature subsets into a plurality of clusters; and
    determining a most frequently occurring feature pattern of the plurality of clusters, to obtain the dominant feature pattern, wherein the dominant feature pattern comprises at least one dominant feature.

10. The method of claim 1, wherein generating the ambiguous feature pattern further comprises:
    clustering the plurality of candidate feature subsets into a plurality of clusters; and
    determining a most frequently occurring ambiguous feature pattern of the plurality of clusters to obtain the ambiguous feature pattern, wherein the ambiguous feature pattern comprises at least one ambiguous feature.

11. The method of claim 1, further comprising:
    obtaining a plurality of user profiles corresponding to a plurality of users of a user application, wherein a user profile of the set of user profiles comprises a plurality of user features, and a plurality of candidate matches, and wherein a candidate match is labeled with one of a negative label or a positive label;
    clustering, by a user profile clustering model, the plurality of user profiles, based on the plurality of user features, to obtain a plurality of user categories, wherein a user category is a cluster of user profiles;
    for a user category of the plurality of user categories:
        obtaining the candidate matches of the user profiles of the user category,
        determining, for the user category, a non-matching threshold by:

selecting the candidate matches of the user profiles of the user category having negative labels to obtain selected negative candidate matches, and setting the non-matching threshold based on a precision criterion of the selected negative candidate matches, determining, for the user category, a strong-matching threshold by:

selecting the candidate matches of the user profiles of the user category having positive labels to obtain selected positive candidate matches, and setting the strong-matching threshold based on a precision criterion of the selected positive candidate matches; and extracting features of the candidate matches of the user profiles of the user category.

12. The method of claim 11, further comprising:

for the user category of the plurality of user categories, calculating impact values corresponding to the features of the candidate matches of the user profiles of the user category, using an impact generation function;

determining confidence intervals of the impact values corresponding to the features of the candidate matches of the user profiles of the user category, and adding the confidence intervals, the non-matching threshold, and the strong-matching threshold to a user category profile of the user category, to obtain a plurality of user category profiles corresponding to the plurality of user categories.

13. A system, comprising:

at least one computer processor;

a user application, executing on the at least one computer processor;

a feature clustering model, executing on the at least one computer processor;

a large language model (LLM), executing on the at least one computer processor; and a matching artificial intelligence (AI) agent, executing on the at least one computer processor and configured for:

cross-referencing, by a matching model of the matching AI agent, a set of features of a user input having a first document type with a set of candidate matches having at least a second document type different from the first document type, wherein a candidate match of the set of candidate matches has a corresponding confidence score satisfying a range having a lower limit of a non-matching threshold and an upper limit of a strong-matching threshold;

partitioning, using a set of corresponding confidence scores of the set of candidate matches, the set of features into a dominant feature subset and a ambiguous feature subset based on the dominant feature subset increasing the set of corresponding confidence scores and the ambiguous feature subset decreasing the set of corresponding confidence scores;

individually generating, for each candidate match in the set of candidate matches, a corresponding candidate feature subset of features selected from the dominant first-feature subset and the ambiguous feature subset for the candidate match, to obtain a plurality of candidate feature subsets;

causing the feature clustering model, to cluster the plurality of candidate feature subsets to obtain a dominant feature pattern and an ambiguous feature pattern;

causing the LLM to generate a suggestion to modify the user input by processing the dominant feature pattern and the ambiguous feature pattern; and presenting the suggestion of the LLM in the user application.

14. The system of claim 13, further configured for:

displaying the suggestion of the LLM in a user interface of the user application;

receiving, via the user interface, a modified user input in accordance with the suggestion;

generating, by the matching model of the matching AI agent, a match for the modified user input, wherein the match is a cross-referencing result that satisfies the modified user input; and storing the cross-referencing result in a storage device.

15. The system of claim 13, further configured for:

partitioning, by a feature analyzer of the matching AI agent, the corresponding set of features by:

for a feature of the corresponding set of features, obtaining a confidence interval of the feature, wherein the confidence interval of the feature is obtained from a user category profile, and wherein the user input originates from a user profile included in the user category profile, determining an impact value of the feature, and responsive to the impact value of the feature satisfying or exceeding the confidence interval, adding the feature to the dominant feature subset, and responsive to the impact value of the feature falling below the lower limit of the confidence interval, adding the feature to the ambiguous feature subset.

16. The system of claim 13, wherein generating the candidate feature subset further comprises:

determining corresponding z-score values of respective impact values of features of the dominant feature subset;

selecting top-k features of the dominant feature subset having top-k z-score values, wherein k is a predefined number;

adding the top-k features of the dominant feature subset to the candidate feature subset;

determining corresponding z-score values of respective impact values of features of the ambiguous feature subset;

selecting bottom-k features of the ambiguous feature subset having bottom-k z-score values, wherein k is a predefined number; and adding the bottom-k features of the ambiguous feature subset to the candidate feature subset.

17. The system of claim 13, wherein obtaining the dominant feature pattern further comprises:

clustering the plurality of candidate feature subsets into a plurality of clusters, and determining a most frequently occurring dominant feature pattern of the plurality of clusters, to obtain the dominant feature pattern, wherein the dominant feature pattern comprises at least one dominant feature, and wherein obtaining the ambiguous feature pattern further comprises:

determining a most frequently occurring ambiguous feature pattern of the plurality of clusters to obtain the ambiguous feature pattern, wherein the ambiguous feature pattern comprises at least one ambiguous feature.

18. The system of claim 13, further configured for:

obtaining a plurality of user profiles corresponding to a plurality of users of a user application, wherein a user profile of the set of user profiles comprises a plurality of user features, and a plurality of candidate matches, and wherein a candidate match is labeled with one of a negative label or a positive label;

causing a user profile clustering model to cluster the plurality of user profiles, based on the plurality of user features, to obtain a plurality of user categories, wherein a user category is a cluster of user profiles;

for a user category of the plurality of user categories:
- obtaining the candidate matches of the user profiles of the user category,
- determining, for the user category, a non-matching threshold by:
  - selecting the candidate matches of the user profiles of the user category having negative labels to obtain selected negative candidate matches, and
  - setting the non-matching threshold based on a precision criterion of the selected negative candidate matches,
- determining, for the user category, a strong-matching threshold by:
  - selecting the candidate matches of the user profiles of the user category having positive labels to obtain selected positive candidate matches, and
  - setting the strong-matching threshold based on a precision criterion of the selected positive candidate matches; and
- extracting features of the candidate matches of the user profiles of the user category.

19. The system of claim 18, further configured for:
for the user category of the plurality of user categories,
- calculating impact values corresponding to the features of the candidate matches of the user profiles of the user category, using an impact generation function,
- determining confidence intervals of the impact values corresponding to the features of the candidate matches of the user profiles of the user category, and
- adding the confidence intervals, the non-matching threshold, and the strong-matching threshold to a user category profile of the user category, to obtain a plurality of user category profiles corresponding to the plurality of user categories.

20. A method, comprising:
obtaining a plurality of user profiles corresponding to a plurality of users of a user application;
clustering, by a user profile clustering model, the plurality of user profiles, based on a plurality of user features corresponding to the plurality of user profiles, to obtain a plurality of user categories;
for a user category of the plurality of user categories:
- determining, for the user category, a non-matching threshold based on candidate matches of user profiles of the user category;
- determining, for the user category, a strong-matching threshold based on the candidate matches of the user profiles of the user category;
- calculating impact values corresponding to features of the candidate matches of the user profiles of the user category, using an impact generation function;
- determining confidence intervals of the impact values corresponding to the features of the candidate matches of the user profiles of the user category, and
- adding the confidence intervals, the non-matching threshold, and the strong-matching threshold to a user category profile of the user category;

cross-referencing, by a matching model, a set of features of a user input having a first document type with a set of candidate matches having at least a second document type different from the first document type;

partitioning, using a set of corresponding confidence scores of the set of candidate matches, the set of features into a dominant feature subset and an ambiguous second-feature subset based on the confidence intervals of the user category profile;

individually generating, for each candidate match in the set of candidate matches, a corresponding candidate feature subset of features selected from the dominant feature subset and the ambiguous feature subset for the candidate match, to obtain a plurality of candidate feature subsets;

clustering the plurality of candidate feature subsets to obtain a dominant feature pattern and an ambiguous feature pattern;

generating by a large language model (LLM), a suggestion to modify the user input by processing the dominant feature pattern and the ambiguous feature pattern; and presenting the suggestion of the LLM.

* * * * *